UNITED STATES PATENT OFFICE.

FRANZ VON KÜGELGEN, OF HOLCOMBS ROCK, VIRGINIA, AND GEORGE O. SEWARD, OF EAST ORANGE, NEW JERSEY, ASSIGNORS, BY MESNE ASSIGNMENTS, TO TIN PRODUCTS COMPANY, OF NEW YORK, N. Y., A CORPORATION OF NEW YORK.

PROCESS OF DETINNING.

972,135.  Specification of Letters Patent.  Patented Oct. 4, 1910.

No Drawing. Original application filed January 16, 1904, Serial No. 189,272. Divided and this application filed January 22, 1908. Serial No. 412,080.

*To all whom it may concern:*

Be it known that we, FRANZ VON KÜGELGEN, a subject of the German Emperor, residing at Holcombs Rock, in the county of Bedford and State of Virginia, and GEORGE O. SEWARD, a citizen of the United States, formerly of Holcombs Rock aforesaid, but now of East Orange, in the county of Essex and State of New Jersey, have jointly invented certain new and useful Improvements in Processes of Detinning, of which the following is a specification.

This invention aims to economically recover the tin from tin scrap.

The processes of detinning heretofore in use are subject to the disadvantages that they fail to recover all of the tin, and the tin which is recovered is accompanied by iron or other elements present in the scrap which are dissolved as impurities with the tin.

The present invention secures a complete detinning, and removes the tin without attacking the iron. It is based on the fact that dry chlorin at a suitably low temperature combines with tin, forming stannic chlorid, but does not attack iron.

In practicing this invention the tin scrap is placed in any suitable vessel, and dry chlorin is introduced into contact with the scrap. The chlorin attacks the tin, forming stannic chlorid; the reaction is attended by active generation of heat, and care must be taken to control the temperature and keep it sufficiently low. A temperature at the walls of the vessel of below 100 degrees Fahrenheit (38° C.) is preferable, but so long as the temperature does not rise so high as to make it impossible to hold the hand against the vessel, (say 140 degrees Fahrenheit,) the process can be successfully practiced. At these relatively low temperatures the iron is attacked only very slightly (about to the extent of its alloy with the tin of the coating) while practically all of the tin is converted into stannic chlorid. If the temperature rises too high, the underlying iron also is attacked, so that it is of great importance to prevent any serious rise of temperature. The temperature may be kept down either by cooling the vessel or by sufficiently limiting the amount of chlorin which enters the vessel. The temperature should be maintained high enough to secure a complete detinning. To accomplish this the temperature should approximate 100 degrees Fahrenheit; if it falls much below this the process becomes too slow to be practicable.

As stannic chlorid ($SnCl_4$) is a liquid having a boiling point of 114 degrees centigrade (237° F.) it may be partly vaporized at the surface of the scrap by the heat of the reaction, but in such case it is retained within the vessel, being condensed on reaching cooler portions of the scrap or on the walls of the vessel. The liquid may be collected by inclining the vessel to drain it from the iron scrap which remains in the vessel. The tin chlorid is very pure, as the impurities of the iron either are not attacked, or if attacked by chlorin remain in the vessel, adhering to the iron, as the iron compounds (chiefly $FeCl_4$) do not form liquids like stannic chlorid, and are not soluble in $SnCl_4$.

That dry chlorin would remove tin from iron has long been known, and that at a low temperature dry chlorin does not combine with iron has also been known; but such efforts as were made to utilize these properties failed because the temperature used was such as to drive off or distil the stannic chlorid from the reaction vessel in the form of vapor, which was condensed or otherwise recovered outside the vessel. To thus drive off the stannic chlorid when operating on a practical scale involves such rapid generation of heat as to cause the chlorin to attack the iron. The temperature was not controlled to keep it below that which would produce this result, no effective cooling being provided. Thus chlorin was wasted in producing worthless ferric chlorid, and the iron of the scrap was impaired or rendered unmarketable. For these reasons the dry chlorin process never was made practically available and never came into use.

For the successful practice of our invention the temperature at the surfaces of the scrap should not greatly exceed the vaporizing point of stannic chlorid, as a higher temperature causes the iron to be attacked, thus wasting chlorin and so increasing the generation of heat that the temperature becomes progressively more difficult to control. Above a certain temperature the chlorin attacks chiefly the iron, and the formation of tin chlorid practically ceases.

Our invention does not necessitate that the chlorin be absolutely pure if only it be practically anhydrous.

The stannic chlorid may be variously utilized. In the form of a crystalline hydrated salt it is an important article of commerce.

The stannic chlorid may if desired be treated by electrolysis or in any chemical manner to recover metallic tin; or tin may be precipitated from the chlorid as an oxid, forming a salable product; or tin or any compound thereof may be recovered or formed from the stannic chlorid by any suitable or known treatment or reaction.

The present application is a division of our application filed January 16, 1904, Serial No. 189,272 (being Patent No. 915,029 granted March 9, 1909).

We claim as our invention:—

1. Detinning with dry chlorin while cooling the reaction vessel sufficiently to cause the resulting stannic chlorid to be recovered in liquid form within the vessel.

2. Detinning with dry chlorin while maintaining the temperature adjacent to the walls of the reaction vessel at approximately 100 degrees Fahrenheit.

3. The recovery of tin from tin scrap by treating the latter in a closed vessel with dry chlorin, and cooling the vessel to maintain within the vessel a temperature below the vaporizing point of stannic chlorid, but sufficiently high to effect complete detinning.

4. The recovery of tin from tin scrap by treating the latter in a closed vessel with dry chlorin to form stannic chlorid, heating internally by the heat of reaction to a temperature sufficiently high to effect complete detinning, and controlling the temperature by cooling the reaction vessel, to keep the temperature below that at which the iron is attacked.

5. The recovery of tin from tin scrap by treating the latter in a closed vessel with dry chlorin to form stannic chlorid, controlling the temperature by cooling the vessel to keep it high enough to effect complete detinning but low enough to prevent attacking the iron and to condense within the vessel such of the stannic chlorid as is vaporized, and draining the liquid stannic chlorid from the residue of iron scrap within the vessel.

6. Detinning with dry chlorin while maintaining the temperature sufficiently high to effect complete detinning, and keeping it below that at which the iron is attacked, condensing the resulting stannic chlorid, and subjecting such chlorid to electrolysis.

7. Detinning with dry chlorin while maintaining the temperature sufficiently high to effect complete detinning, and keeping it below that at which the iron is attacked, condensing the resulting stannic chlorid, and treating such chlorid to recover metallic tin therefrom.

In witness whereof, I have hereunto signed my name in the presence of two subscribing witnesses.

FRANZ VON KÜGELGEN.

Witnesses:
  JNO. M. OTEY,
  W. H. LIGGAN.

In witness whereof, I have hereunto signed my name in the presence of two subscribing witnesses.

GEORGE O. SEWARD.

Witnesses:
  ARTHUR C. FRESER,
  FRED WHITE.